United States Patent
Baldoni et al.

(10) Patent No.: US 12,502,921 B2
(45) Date of Patent: Dec. 23, 2025

(54) PROTECTION PLUGS WITH BIDIRECTIONAL PRESSURIZING FUNCTIONALITY FOR SHOCK ABSORBER

(71) Applicant: Advanced Suspension Technology LLC, Northville, MI (US)

(72) Inventors: Frederik Baldoni, Borgloon (BE); Tom Vandersmissen, Limburg (BE)

(73) Assignee: Advanced Suspension Technology LLC, Northville, MI (US)

( * ) Notice: Subject to any disclaimer, the term of this patent is extended or adjusted under 35 U.S.C. 154(b) by 536 days.

(21) Appl. No.: 18/080,180

(22) Filed: Dec. 13, 2022

(65) Prior Publication Data

US 2024/0190196 A1  Jun. 13, 2024

(51) Int. Cl.
*B60G 13/08* (2006.01)
*B60G 13/14* (2006.01)

(52) U.S. Cl.
CPC .......... *B60G 13/08* (2013.01); *B60G 13/14* (2013.01); *B60G 2202/24* (2013.01); *B60G 2204/40* (2013.01); *B60G 2206/41* (2013.01); *B60G 2206/91* (2013.01); *B60G 2500/114* (2013.01)

(58) Field of Classification Search
CPC .... B60G 13/08; B60G 13/14; B60G 2202/24; B60G 2204/40; B60G 2206/41; B60G 2206/91; B60G 2500/114
USPC ......... 188/313, 322.21; 137/511, 512.4, 514, 137/846, 877, 878
See application file for complete search history.

(56) References Cited

U.S. PATENT DOCUMENTS

| | | | | |
|---|---|---|---|---|
| 3,504,699 A | * | 4/1970 | Grise | ..... F16K 15/147 137/846 |
| 5,458,219 A | * | 10/1995 | Anderson | ..... F16F 9/092 188/315 |
| 5,682,966 A | * | 11/1997 | Cabrerizo-Pariente | ... F16F 9/56 188/269 |
| 6,044,752 A | | 4/2000 | Harigaya | |

(Continued)

FOREIGN PATENT DOCUMENTS

| CN | 202402627 U | 8/2012 |
|---|---|---|
| CN | 216618089 U | 5/2022 |

(Continued)

OTHER PUBLICATIONS

International Search Report and Written Opinion of the ISA issued in PCT/US2023/083607, mailed Apr. 18, 2024; ISA/US.

*Primary Examiner* — Christopher P Schwartz
(74) *Attorney, Agent, or Firm* — Harness, Dickey & Pierce, P.L.C.

(57) ABSTRACT

A hydraulic port protection plug for insertion into a hydraulic port in a shock absorber assembly, where the hydraulic port protection plug comprises a cap portion with a disc-shaped end wall and a tubular body that extends from the cap portion to define an open-ended cavity. The open-ended cavity extends within the tubular body of the hydraulic port protection plug and is bounded at one end by the cap portion. A self-closing pressure relief opening extends through the cap portion and is arranged in fluid communication with the open-ended cavity. At least a portion of the cap portion is made of an elastic material that permits the self-closing pressure relief opening to open and close in response to pressure changes.

20 Claims, 11 Drawing Sheets

(56) References Cited

U.S. PATENT DOCUMENTS

| | | | | |
|---|---|---|---|---|
| 7,168,535 | B2* | 1/2007 | Harbu | F16F 9/435 |
| | | | | 138/31 |
| 7,445,028 | B1* | 11/2008 | Aanonsen | F16K 15/147 |
| | | | | 137/849 |
| 8,579,870 | B2* | 11/2013 | Willis | A61J 15/0092 |
| | | | | 604/167.04 |
| 9,120,410 | B2* | 9/2015 | Bauman | B60N 2/522 |
| 10,335,561 | B2* | 7/2019 | Krüger | A61M 15/0013 |
| 10,859,540 | B2* | 12/2020 | Carlisle | G01N 30/18 |
| 2004/0089507 | A1 | 5/2004 | Harbu | |
| 2024/0191769 | A1* | 6/2024 | Henderickx | B60G 13/08 |

FOREIGN PATENT DOCUMENTS

| | | |
|---|---|---|
| FR | 2136944 A1 | 12/1972 |
| JP | 2005133902 A | 5/2005 |
| JP | 2007205416 A | 8/2007 |
| KR | 20090087180 A | 8/2009 |
| WO | WO-2020252243 A1 | 12/2020 |

\* cited by examiner

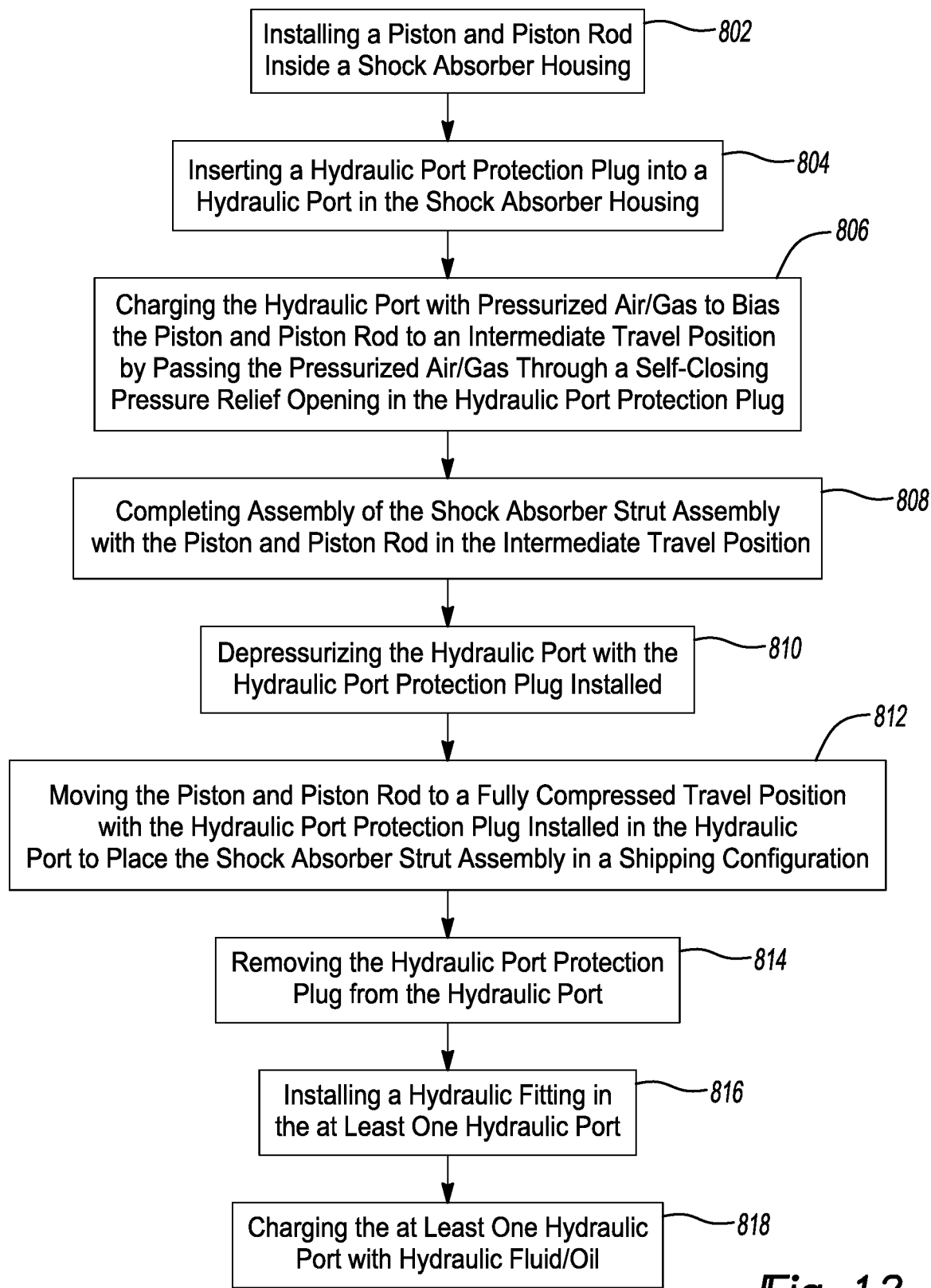

PROTECTION PLUGS WITH BIDIRECTIONAL PRESSURIZING FUNCTIONALITY FOR SHOCK ABSORBER

FIELD

The present disclosure relates generally to shock absorbers for use in a suspension system such as a suspension system used for motor vehicles. More particularly, the present disclosure relates to protection plugs that are installed in the hydraulic ports of shock absorbers to prevent contamination during shipping, handling, and storage before the shock absorber is installed on a vehicle.

BACKGROUND

The statements in this section merely provide background information related to the present disclosure and may not constitute prior art.

Shock absorbers are used in conjunction with vehicle suspension systems to absorb unwanted vibrations and impacts which occur during movement of the vehicle. In order to absorb these unwanted vibrations and impacts, shock absorbers are generally connected between the sprung (body) and the unsprung (suspension/chassis) masses of the vehicle.

The most common type of shock absorbers for automobiles is the dashpot type. A piston is located within a pressure tube and is typically connected to the sprung mass of the vehicle through a piston rod. The pressure tube is typically connected to the unsprung mass of the vehicle. The piston divides the pressure tube into an upper working chamber and a lower working chamber. Valving limits the flow of damping fluid from the lower working chamber to the upper working chamber during compression and rebound strokes. Because the compression and rebound valving has the ability to limit the flow of damping fluid, the shock absorber is able to produce a damping force which counteracts the vibrations which would otherwise be transmitted from the unsprung mass to the sprung mass.

Shock absorbers are frequently incorporated as a component in a larger shock absorber assembly, which may additionally include mounting fixtures, electromechanical valves to control dampening forces, and spring assemblies. Such spring assemblies can include coil-over springs that extend helically about a portion of the shock absorber or air springs that may include an air bladder that extended annularly about a portion of the shock absorber.

SUMMARY

This section provides a general summary of the disclosure and is not a comprehensive disclosure of its full scope or all of its features.

In accordance with one aspect of the subject disclosure, a pre-installation shock absorber assembly is provided, which includes a shock absorber with a sliding piston that divides the shock absorber into first and second working chambers. A piston rod is mounted to the sliding piston and the shock absorber assembly has a lower housing opposite the piston rod. At least one hydraulic port is provided in the lower housing of the shock absorber. One or more hydraulic port protection plugs are provided to seal the hydraulic port(s) in the lower housing during shipping, handling, and storage of the shock absorber assembly before it is installed on a vehicle. The hydraulic port protection plugs have a cap portion and a tubular body and prevent contaminants from entering the hydraulic port(s) of the shock absorber assembly, while also preventing any residual oil from leaking from the shock absorber assembly during shipping, handling, and storage. The tubular body of the hydraulic port protection plug extends from the cap portion and has a geometric configuration that is configured to be inserted into one of the hydraulic ports in the lower housing of the shock absorber assembly. Each hydraulic port protection plug includes a self-closing pressure relief opening that extends through the cap portion of the hydraulic port protection plug. The self-closing pressure relief opening in the hydraulic port protection plug is configured to open and close in response to pressure changes, allowing pressurized air or gas to pass through the hydraulic port protection plug from high pressure on one side of the cap portion to lower pressure on an opposite side of the cap portion.

In accordance with another aspect of the subject disclosure, a hydraulic port protection plug for insertion into a hydraulic port in a shock absorber assembly is provided. The hydraulic port protection plug comprises a cap portion having a disc-shaped end wall and a tubular body that extends from the cap portion to define an open-ended cavity. The open-ended cavity extends within the tubular body of the hydraulic port protection plug and is bounded at one end by the disc-shaped end wall of the cap portion. A self-closing pressure relief opening extends through the disc-shaped end wall in the cap portion and is arranged in fluid communication with the open-ended cavity defined by the tubular body. At least a portion of the disc-shaped end wall is made of an elastic material that permits the self-closing pressure relief opening to open and close in response to pressure changes.

In accordance with another aspect of the subject disclosure, a method of assembling a shock absorber assembly using the hydraulic port protection plug described above is also provided. The method comprises the steps of: installing a piston and a piston rod inside a shock absorber housing, inserting at least one hydraulic port protection plug into at least one hydraulic port in the shock absorber housing, and charging the at least one hydraulic port with pressurized air or gas to bias the piston and the piston rod to an intermediate travel position. This charging step includes passing the pressurized air or gas through a self-closing pressure relief opening in the at least one hydraulic port protection plug after the at least one hydraulic port protection plug is inserted into the at least one hydraulic port. The method then proceeds with the step of continuing assembly of the shock absorber assembly with the piston and the piston rod in the intermediate travel position.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 12 is a flow diagram illustrating exemplary steps of a method for assembling the exemplary shock absorber assembly shown in FIG. 1.

DETAILED DESCRIPTION

Figure 1:
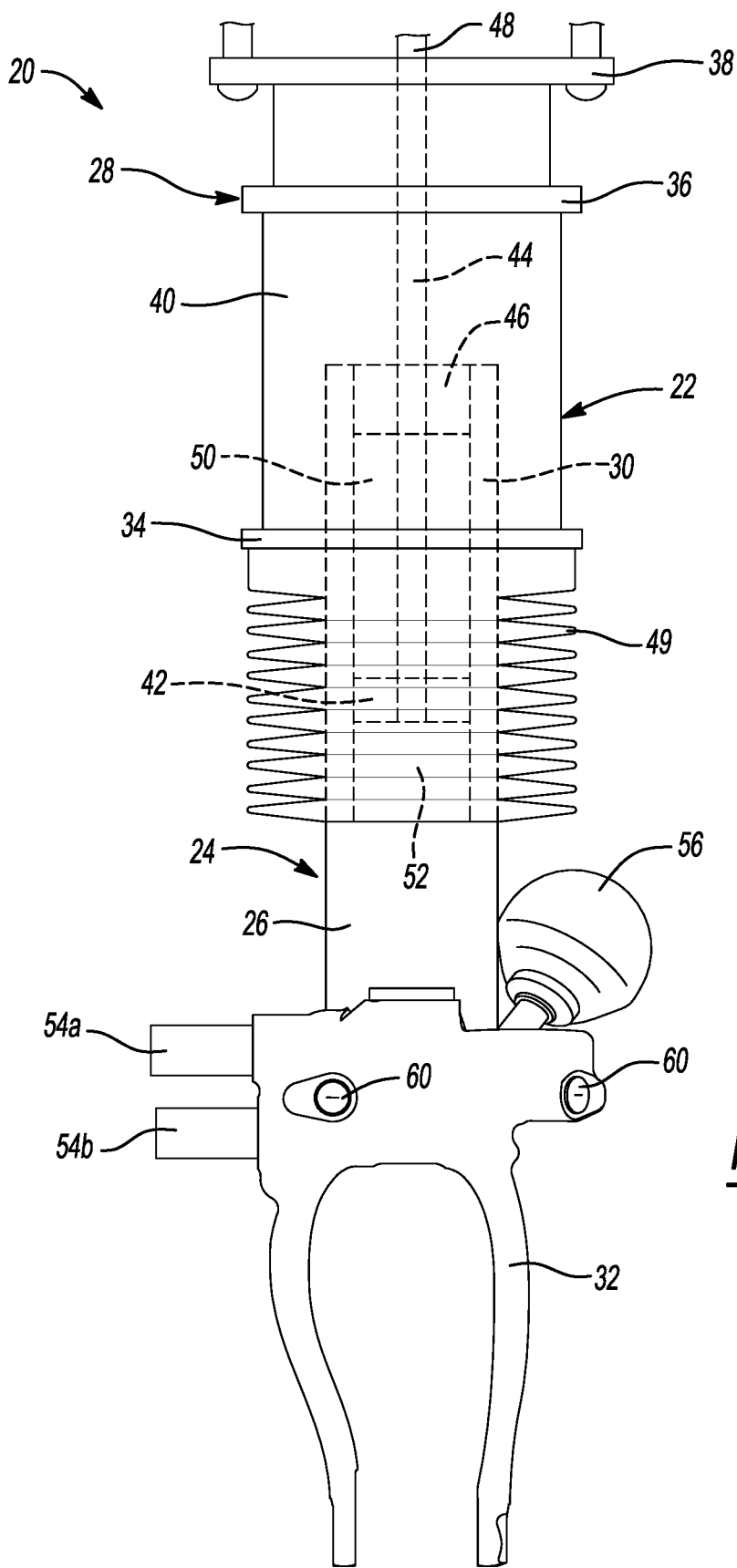
FIG. 1 is a side elevation view of an exemplary shock absorber assembly that has been constructed in accordance with the present disclosure.

The following description is merely exemplary in nature and is not intended to limit the present disclosure, application, or uses.

Referring to the Figures, wherein like numerals indicate corresponding parts throughout the several views, various comfort valve equipped suspension systems are shown.

Example embodiments will now be described more fully with reference to the accompanying drawings. Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the shock absorber assembly 20 that is showing in the Figures is turned over, the element described a "lower housing" would then be oriented "above" other elements or features. Thus, the example term "lower" can encompass both lower and upper orientations depending on the orientation of the shock absorber assembly 20, which may be otherwise oriented than the orientations shown in the Figures (e.g., rotated 90 or 180 degrees or at other orientations) and the spatially relative descriptors used herein should be interpreted accordingly.

FIG. 1 illustrates an exemplary pre-installation shock absorber assembly 20, which includes a spring 22 that extends annularly about a shock absorber 24 to form the overall shock absorber assembly 20. It should be appreciated that the shock absorber assembly 20 is configured to be installed in a vehicle as part of a suspension system. It should also be appreciated that the shock absorber assembly 20 illustrated in FIG. 1 is shown in a pre-installation configuration, state, or condition and is therefore pictured before installation in a vehicle. It should also be understood that the shock absorber assembly 20 will typically be shipped, handled, and stored in this pre-installation configuration, state, or condition, where the shock absorber 24 is not yet filled with a working volume of hydraulic fluid or oil, although there may be some residual fluid or oil in the shock absorber 24 from assembly and/or testing.

The shock absorber assembly 20 includes a lower housing 26 and an upper assembly 28. The lower housing 26 is formed by a pressure tube 30 of the shock absorber 24 and a mounting fixture 32. In the illustrated embodiment, the mounting fixture 32 is provided in the form of a yoke; however, it should be appreciated that the mounting fixture 32 may be provided in the form of other types/styles of attachment structures. Regardless of type, the mounting fixture 32 is configured to attach to an unsprung component of the vehicle, such as an axle, wheel knuckle, or lower swing-arm. The upper assembly 28 is formed by the spring 22, a lower spring seat 34, an upper spring seat 36, and a top mount 38. The top mount 38 comprises an integral molded body and a rigid body member typically made of stamped steel. Top mount 38 is therefore configured to mount to a sprung component of the vehicle, such as a shock tower in a body of the vehicle.

A rubber dust boot 49 may be provided to cover the spring 22 and a telescoping portion of shock absorber 24 to protect the spring 22 and the shock absorber 24 from dirt, water, and other contamination. Although other types of springs may be used, including a coil spring for example, the spring 22 in the illustrated example is an air spring that includes an air bladder 40 that extends annularly about an upper portion of the shock absorber 24 and longitudinally between the lower and upper spring seats 34, 36.

The shock absorber 24 includes a sliding piston 42 that is disposed in sliding engagement within the pressure tube 30, a piston rod 44 that is attached to the sliding piston 42, and a rod guide 46 that is positioned in an upper end of the pressure tube 30. The piston rod 44 extends from the sliding piston 42 in an upward manner, through the rod guide 46, and to an upper rod end 48. The upper rod end 48 attaches to the top mount 38 and therefore to the sprung component of the vehicle.

The sliding piston 42 is slidably disposed within the pressure tube 30 and divides an inner volume of the pressure tube 30 into a first working chamber 50 and a second working chamber 52. The piston rod 44 is attached to sliding piston 42 and extends through the first working chamber 50 and through the rod guide 46, which closes an upper end of the first working chamber 50.

During compression and extension (e.g., rebound) movements of the shock absorber 24, hydraulic fluid or oil moves from either the first working chamber 50 to the second working chamber 52 or from the second working chamber 52 to the first working chamber 50. This provides dampening, which can be plotted on frequency vs. dissipation response curves, that continues to rise at an ever increasing rate as the frequency of the damped vibration increases. The shock absorber assembly 20 has externally mounted electromechanical valves 54a, 54b for dynamically controlling the fluid flow between the first and second working chambers 50, 52 and therefore the dampening rate of the shock absorber 24. The shock absorber assembly 20 also includes an externally mounted accumulator 56. In operation, hydraulic fluid or oil is permitted to flow between the accumulator 56 and the shock absorber 24 to provide pressure and temperature compensation.

Figure 2:
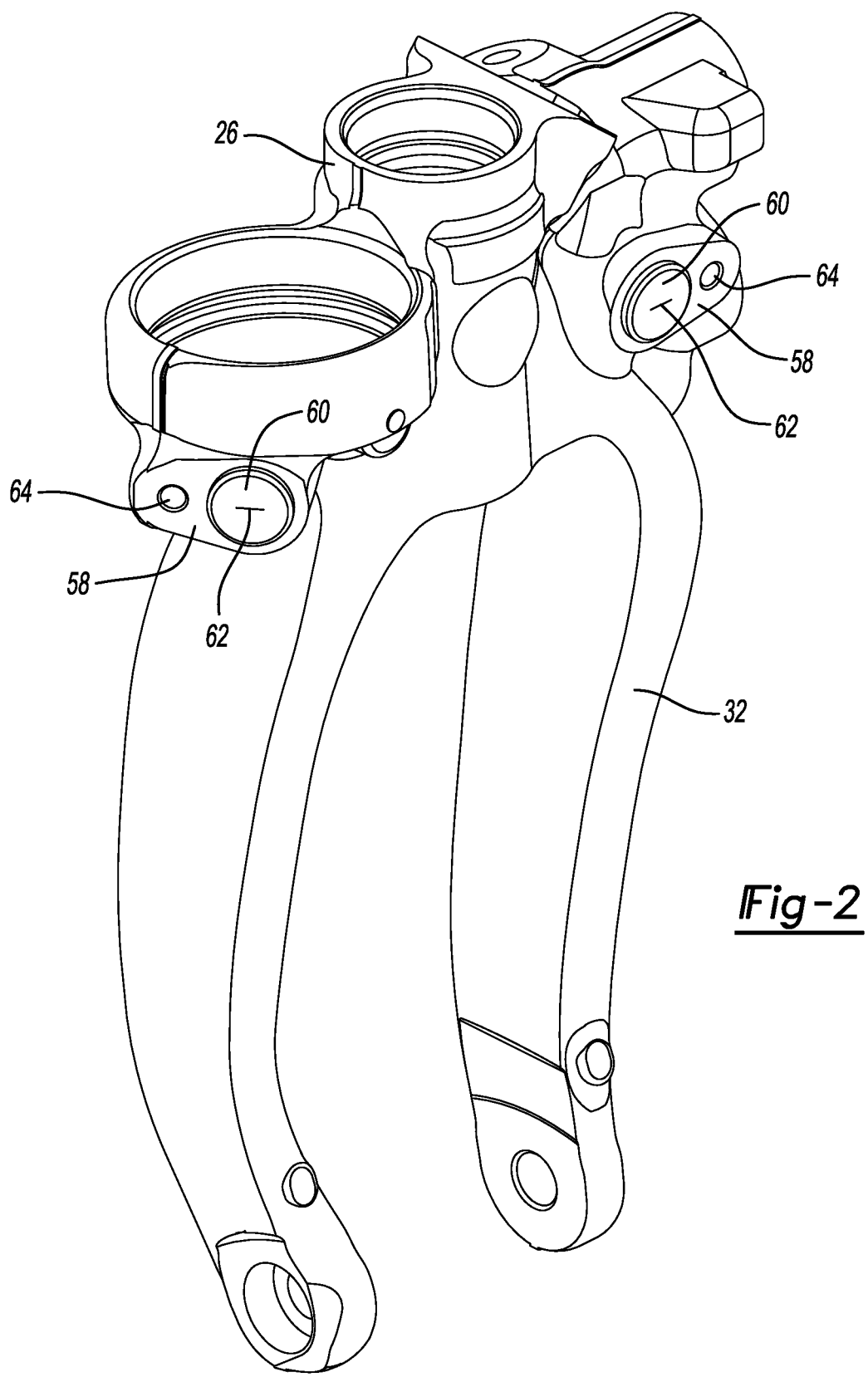
FIG. 2 is an enlarged perspective view of a lower housing and yoke of the exemplary shock absorber assembly illustrated in FIG. 1 where a pair of exemplary hydraulic port protection plugs are shown installed in two respective hydraulic ports in the lower housing.

FIG. 2 illustrates part of the lower housing 26 of the shock absorber assembly 20, which includes the mounting fixture 32 (i.e., the yoke). The lower housing 26 includes a pair of hydraulic port lands 58 and a pair of hydraulic port protection plugs 60 that are seated in the hydraulic port lands 58. As will be discussed in greater detail below, each hydraulic port protection plug 60 has a self-closing pressure relief opening 62 that is configured to open and close in response to pressure changes resulting from pressurization or depressurization of the shock absorber 24 and/or movement of the piston 42 and the piston rod 44 during or after assembly and after installation of the hydraulic port protection plugs 60. Thus, it should be appreciated that the hydraulic port protection plugs 60 are designed and configured to be installed on the hydraulic port lands 58 of the lower housing 26 of the shock absorber 24 when the shock absorber 24 is in a pre-installation condition and does not contain a working volume of oil. In this sense, the hydraulic port protection plugs 60 can be considered as shipping plugs and/or storage plugs and are designed and intended to be removed when the shock absorber assembly 20 is being installed in a vehicle and subsequently filled with a working volume of hydraulic fluid or oil. In other words, the hydraulic port protection plugs 60 are not designed or intended to remain installed on the shock absorber 24 after the shock absorber assembly 20 has been fully installed on the vehicle. This is because hydraulic fittings and hydraulic lines of hydraulic cross-over circuits are intended to be attached to the hydraulic port lands 58 when the shock absorber assembly 20 is fully installed on the vehicle.

Each hydraulic port land 58 also includes a threaded bore 64 for use in attaching a pressurizing tool assembly (shown in FIGS. 8A-11A) to each hydraulic port land 58. As will be explained in greater detail below, the hydraulic port protection plugs 60 are also designed and configured to be installed on the hydraulic port lands 58 of the lower housing 26 of the shock absorber 24 before the shock absorber 24 is charged with pressurized air or gas during the assembly process. This is different from traditional shipping plugs, which cannot be installed prior to charging/pressurization because traditional shipping plugs do not have any openings to permit the passage of pressurized air or gas. Traditional shipping plugs also suffer from the problem of becoming unseated/blowing out from the hydraulic port land 58 if the piston rod 44 is moved after the shipping plugs are installed due to the pressure generated by the piston 42 in the first and/or second working chambers 50, 52. The hydraulic port protection plugs 60 described herein solve these problems and therefore allow for higher cleanliness specifications because the self-closing pressure relief opening 62 allows air and/or pressurized gas to flow through the hydraulic port protection plugs 60 during the pressurization or depressurization of the shock absorber 24 and/or during movements of the piston 42 and the piston rod 44 during or after assembly and after installation of the hydraulic port protection plugs 60. Due to the geometrical shape and internal drillings of the shock absorber assembly 20, it can be difficult to drain hydraulic fluid or oil from the shock absorber assembly 20 before inserting the hydraulic port protection plugs 60. So in addition to preventing contaminants from entering the shock absorber 24, the self-closing pressure relief opening 62 also prevents any residual hydraulic fluid or oil remaining in the shock absorber 24 from assembly or testing from leaking out during shipping, handling, or storage. Thus, over time, a small column of hydraulic fluid or oil may accumulate behind the hydraulic port protection plugs 60 after they are installed.

Figure 3:
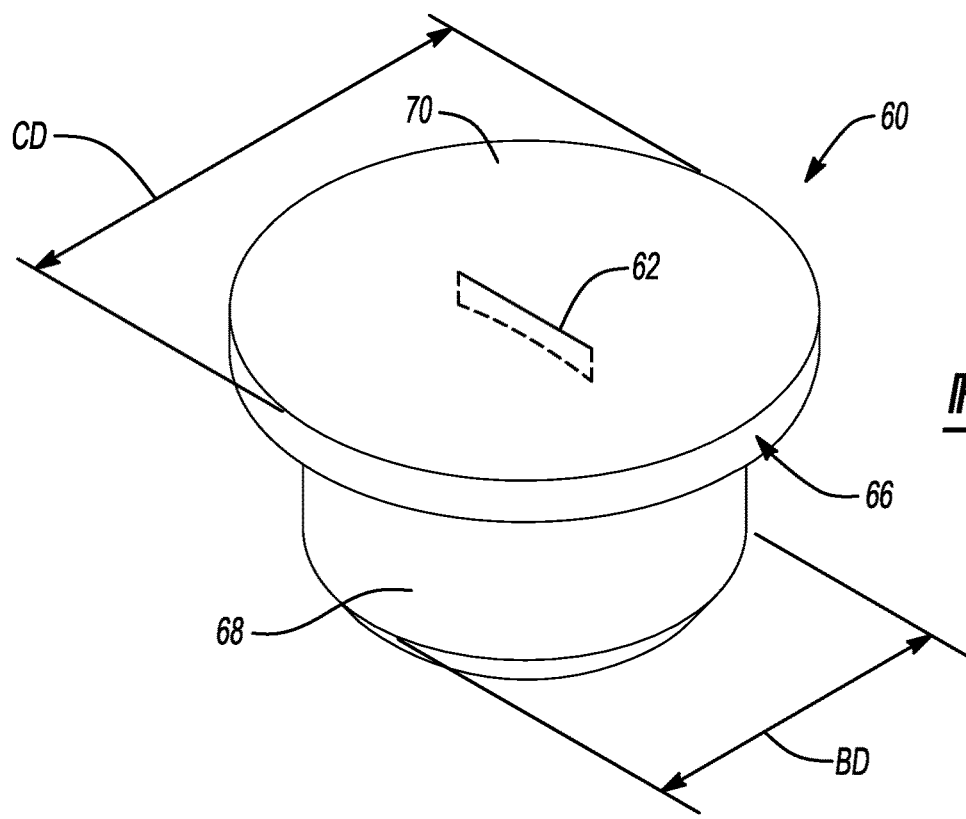
FIG. 3 is a top perspective view of one of the exemplary hydraulic port protection plugs illustrated in FIG. 2.
Figure 4:
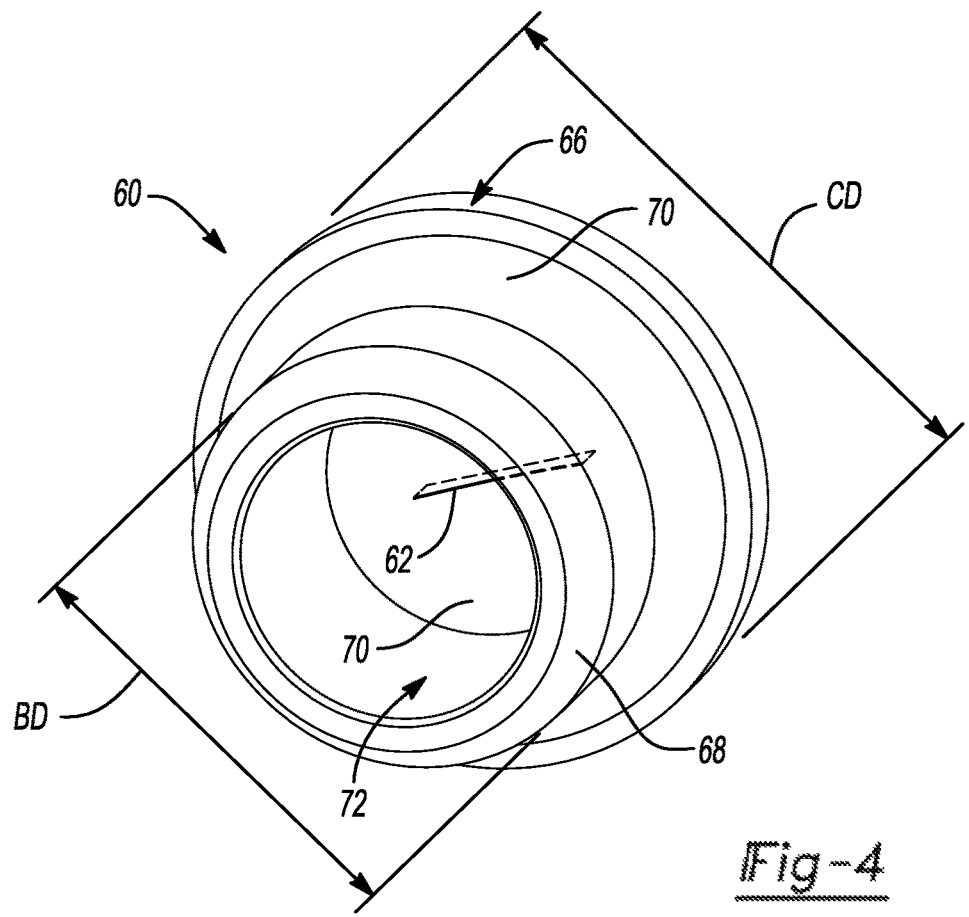
FIG. 4 is a bottom perspective view of the exemplary hydraulic port protection plug illustrated in FIG. 3.

Referring to FIGS. 3 and 4, the hydraulic port protection plug 60 includes a cap portion 66 and tubular body 68. The cap portion 66 has a disc-shaped end wall 70. The tubular body 68 extends from the end wall 70 of the cap portion 66 to define an open-ended cavity 72 within the tubular body 68. Thus, the open-ended cavity 72 has one open end that is open and an opposite end that is bounded by the end wall 70 of the cap portion 66. The tubular body 68 has a body diameter BD. The disc-shaped end wall 70 of the cap portion 66 extends radially outwardly from the tubular body 68 to define a cap diameter CD that is larger than the body diameter BD.

The self-closing pressure relief opening 62 extends through the disc-shaped end wall 70 of the cap portion 66 and is arranged in fluid communication with the open-ended cavity 72 in the tubular body 68. In the embodiment shown in FIGS. 2-4, the self-closing pressure relief opening 62 is a linear slit that extends through the end wall 70 of the cap portion 66, but as will be discussed in more detail below, the self-closing pressure relief opening 62 may have other configurations. At least a portion of the disc-shaped end wall 70 of the cap portion 66 is made of an elastic material that permits the self-closing pressure relief opening 62 to open and close in response to pressure changes. This functionality is explained in greater detail below. By way of example and without limitation, the elastic material may be nitrile rubber (NBR) with a durometer of approximately 70 shore, which is sufficient to prevent unwanted leakage through the self-closing pressure relief opening 62.

Figure 5A:
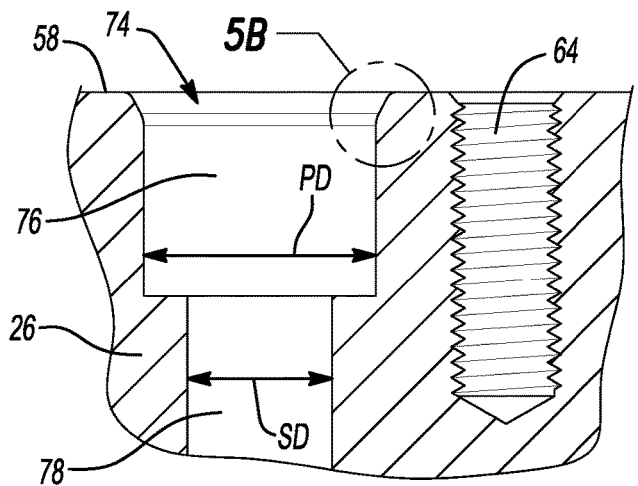
FIGS. 5A and 5B are enlarged cross-sectional views of the lower housing of the exemplary shock absorber assembly shown in FIG. 1 and illustrate the geometry of an exemplary hydraulic port provided therein.
Figure 5B:
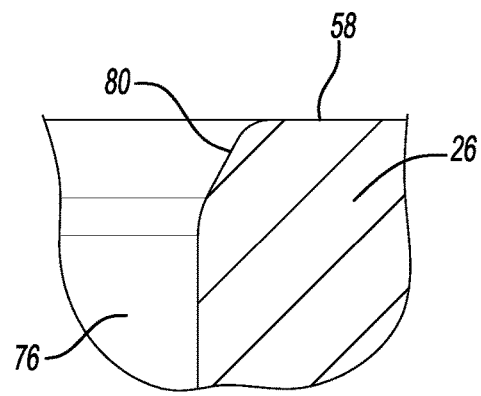

With reference to FIGS. 5A-5B, each hydraulic port land 58 on the lower housing 26 of the shock absorber assembly 20 includes a hydraulic port 74 next to the threaded bore 64. Both the hydraulic port 74 and the threaded bore 64 extend into the lower housing 26. The threaded bore 64 terminates at a closed end. By contrast, the hydraulic port 74 is arranged in fluid communication with one of the first and second working chambers 50, 52 of the shock absorber 24. The hydraulic port 74 is configured to receive a hydraulic fitting coupled to the hydraulic line of a hydraulic cross-over circuit that is connected to one or more other shock absorbers 24 of the vehicle. Thus, the hydraulic port 74 is a stepped bore that includes a primary opening 76, a smaller secondary opening 78, and a chamfered rim 80.

Figure 6A:
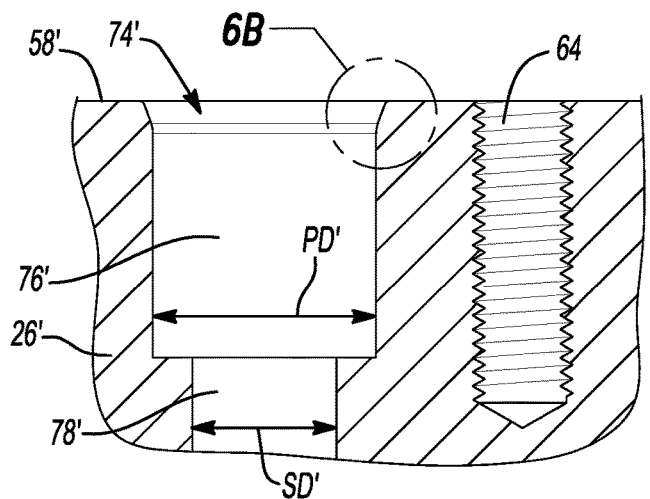
FIGS. 6A and 6B are enlarged cross-sectional views of the lower housing of the exemplary shock absorber assembly shown in FIG. 1 and illustrate the geometry of another exemplary hydraulic port provided therein.
Figure 6B:
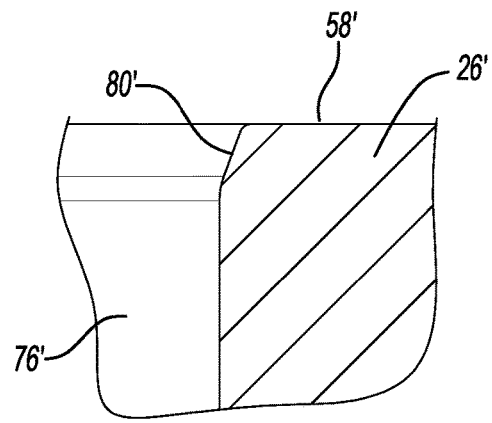
Figure 7A:
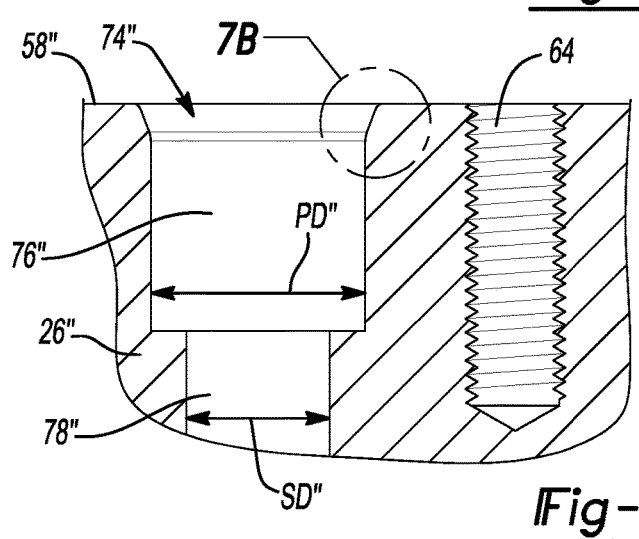
FIGS. 7A and 7B are enlarged cross-sectional views of the lower housing of the shock absorber assembly shown in FIG. 1 and illustrate the geometry of another exemplary hydraulic port provided therein.
Figure 7B:
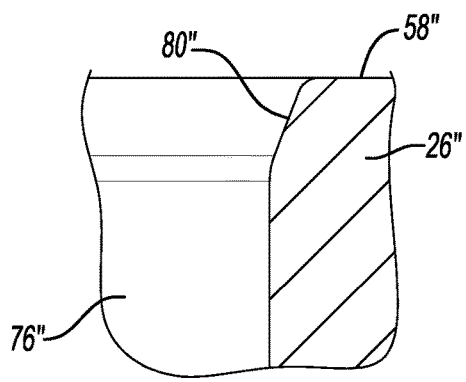

The size and geometry of the primary opening 76, secondary opening 78, and chamfered rim 80 of the hydraulic port 74 may vary to correspond to a particular hydraulic fitting. In the example shown in FIGS. 5A-5B, the primary opening 76 of the hydraulic port 74 has a primary opening diameter PD of approximately 16 millimeters (mm) and the secondary opening 78 has a secondary opening diameter SD of approximately 10 millimeters (mm). In the example shown in FIGS. 6A-6B, the primary opening 76' of the hydraulic port 74' has a primary opening diameter PD' of approximately 17 millimeters (mm) and the secondary opening 78' has a secondary opening diameter SD' of approximately 10 millimeters (mm). In addition, the chamfered rim 80' in the hydraulic port land 58' on the lower housing 26' shown in FIGS. 6A-6B has a different geometry than the example shown in FIGS. 5A-5B. In the example shown in FIGS. 7A-7B, the primary opening 76" of the hydraulic port 74" has a primary opening diameter PD" of approximately 15 millimeters (mm) and the secondary opening 78" has a secondary opening diameter SD" of approximately 10 millimeters (mm). In addition, the chamfered rim 80" in the hydraulic port land 58" on the lower housing 26" shown in FIGS. 7A-7B has a different geometry than the examples shown in FIGS. 5A-5B and FIGS. 6A-6B. It should be appreciated that the various sizes and geometries described herein are merely exemplary in nature and are not limiting. However, it should be appreciated that an advantage of the hydraulic port protection plugs 60 described herein is that they are designed to be insertable and adequately retained in hydraulic ports 74, 74', 74" of several different sizes and geometries and therefore can work in a wider range of applications that traditional plugs. This means that fewer sizes and variations are required to cover a range of different hydraulic ports 74, 74', 74", which translates into cost savings and assembly line advantages.

Figure 8A:
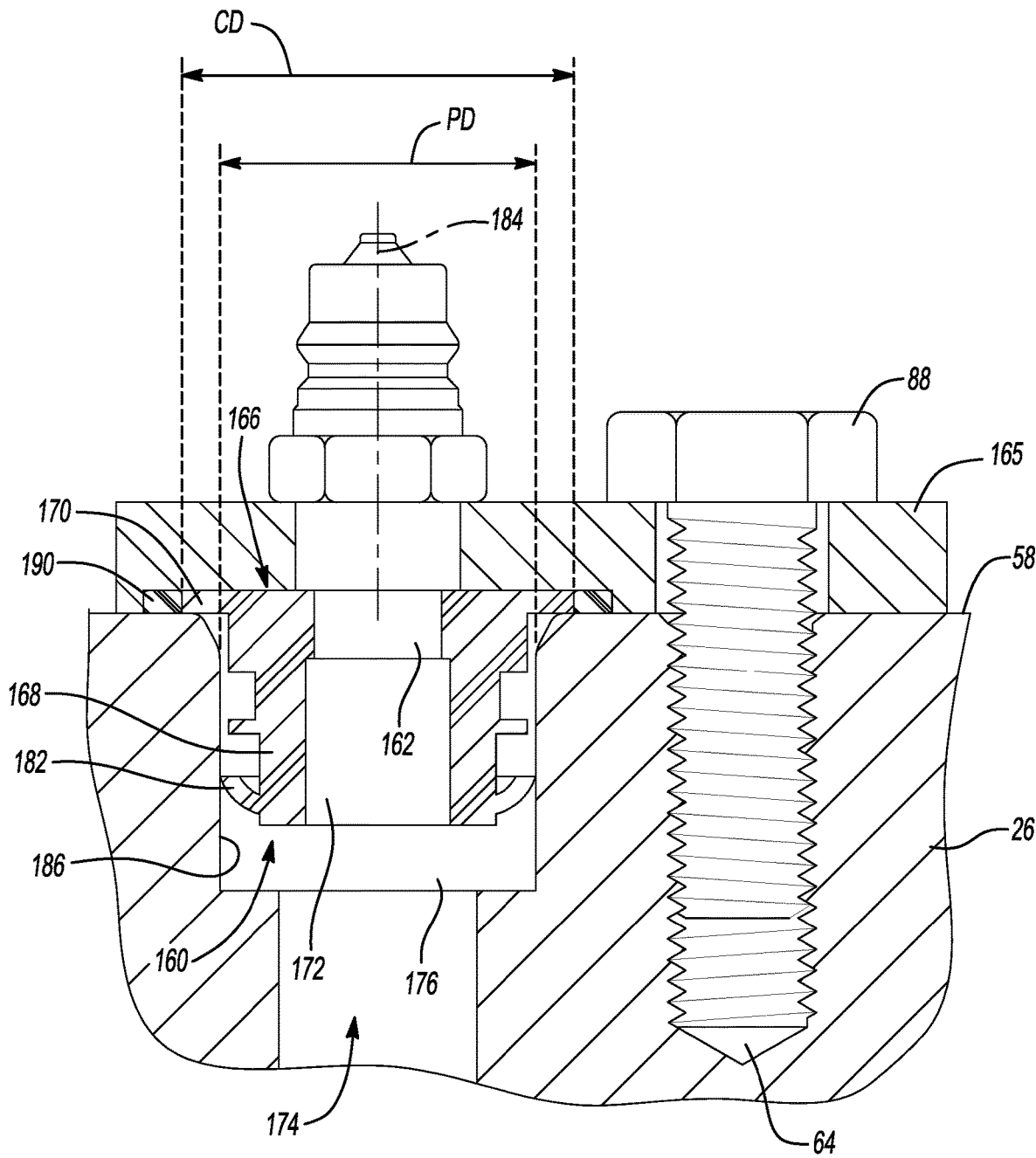
FIG. 8A is an enlarged cross-sectional view of the lower housing of the exemplary shock absorber assembly shown in FIG. 1 and illustrates an exemplary hydraulic port protection plug that is installed in an exemplary hydraulic port in the lower housing.
Figure 8B:
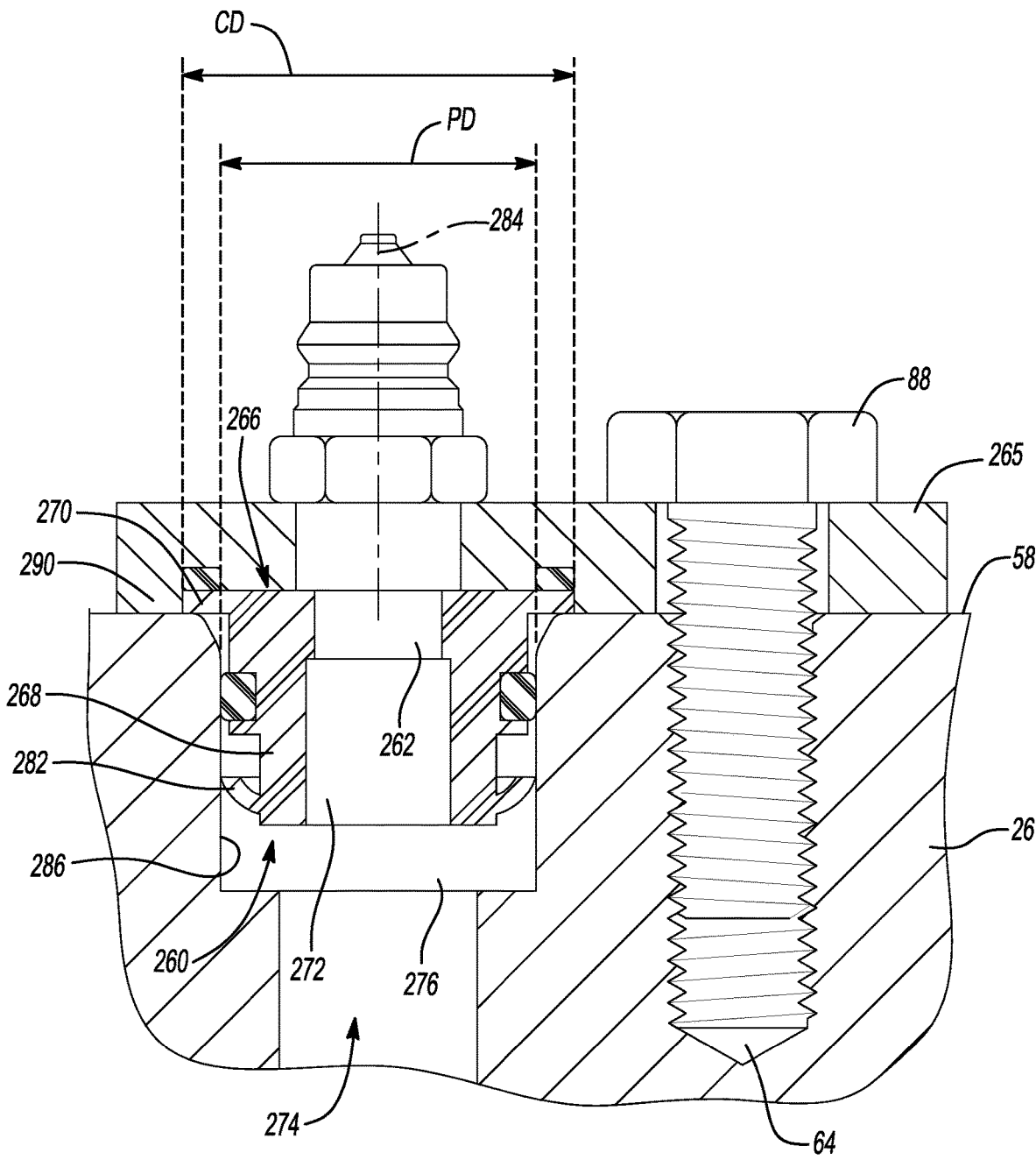
FIG. 8B is an enlarged cross-sectional view of the lower housing of the exemplary shock absorber assembly shown in FIG. 1 and illustrates another exemplary hydraulic port protection plug that is installed in an exemplary hydraulic port in the lower housing.

FIGS. 8A-8B illustrate two different configurations of hydraulic port protection plugs 160, 260, where each hydraulic port protection plug 160, 260 has a self-closing pressure relief opening 162, 262 in the form of a linear slit. The hydraulic port protection plugs 160, 260 also have a cap portion 166, 266 and a tubular body 168, 268. The tubular body 168, 268 extends from the cap portion 166, 266 and has a geometric configuration that is configured to be insertable into a primary opening 176, 276 in a hydraulic port 174, 274 provided in the lower housing 26 of the shock absorber assembly 20. The primary opening 176, 276 in the hydraulic port 174, 274 has a primary opening diameter PD. The cap portion 166, 266 of the hydraulic port protection plugs 160, 260 includes an end wall 170, 270 and the tubular body 168, 268 extends from the end wall 170, 270 to define an open-ended cavity 172, 272 within the tubular body 168, 268 that is bounded at one end by the end wall 170, 270. The end wall 170, 270 of the cap portion 168, 268 extends radially outward from the tubular body 168, 268 to define a cap diameter CD that is larger than the primary opening diameter PD.

The tubular body 168, 268 of the hydraulic port protection plugs 160, 260 shown in FIGS. 8A-8B also include a deflectable flange 182, 282 that extends outwardly from the tubular body 168, 268 at a location that is longitudinally spaced from the end wall 170, 270. Stated another way, the deflectable flange 182, 282 extends radially outward away from a centerline 184, 284 of the hydraulic port protection plugs 160, 260 and is configured to seal against an inner surface 186, 286 of the hydraulic ports 174, 274 in the lower housing 26 of the shock absorber assembly 20.

FIGS. 8A-8B illustrate a pressurizing tool assembly 165, 265 that is secured in an abutting arrangement with the hydraulic port land 58 on the lower housing 26 by a bolt 88 that screws into the threaded bore 64 in the hydraulic port land 58. At least a portion of the cap portion 166, 266 of the hydraulic port protection plugs 160, 260 is made of an elastic material that permits the self-closing pressure relief opening 162, 262 to open when pressurized air or gas is supplied to the pressurizing tool assembly 165, 265. When this occurs, the pressurized air or gas passes through the self-closing pressure relief opening 162, 262 and into the hydraulic ports 174, 274 thereby pressurizing the first and/or second working chambers 50, 52 of the shock absorber 24. Pressurized air or gas may flow in the opposite direction if negative pressure (e.g., vacuum pressure) is applied to the pressurizing tool assembly 165, 265 to depressurize the first and/or second working chambers 50, 52 of the shock absorber 24. When the pressurizing tool assembly 165, 265 is removed, the elastic/resilient properties of the cap portion 166, 266 of the hydraulic port protection plugs 160, 260 permits pressure to bleed out from the hydraulic ports 174, 274 through the self-closing pressure relief openings 162, 262 if pressure increases in the hydraulic ports 174, 274 as a result of movement of the piston 42 and the piston rod 44 after the hydraulic port protection plugs 174, 274 are inserted into the hydraulic ports 174, 274. For example, if the piston rod 44 is extended, the pressure in the first working chamber 50 may increase and increase the pressure in the hydraulic port 174, 274 that is connected in fluid communication with the first working chamber 50. Conversely, if the piston rod 44 is compressed, the pressure in the second working chamber 52 may increase and increase the pressure in the hydraulic port 174, 274 that is connected in fluid communication with the second working chamber 52. The elastic/resilient properties of the cap portion 166, 266 of the hydraulic port protection plugs 160, 260 permits pressure to bleed out from the hydraulic ports 174, 274 through the self-closing pressure relief openings 162, 262. This prevents the hydraulic port protection plugs 160, 260 from blowing out of the hydraulic ports 174, 274 when the piston rod 44 is extended or compressed. It also enables the piston rod 44 of the shock absorber assembly 20 to be moved to a fully compressed travel position for shipment, which reduces the overall length of the shock absorber assembly 20 during shipping, to reduce packaging and shipping costs.

FIGS. 8A and 8B differ in that they illustrate different sealing arrangements. In FIG. 8A, the pressurizing tool assembly 165 includes an O-ring seal 190 that extends annually about and is radially outward of the cap portion 166 of the hydraulic port protection plug 160. In FIG. 8B, the pressurizing tool assembly 265 includes an O-ring seal 290 that is positioned to abut the disc-shaped end wall 270 of the cap portion 266 of the hydraulic port protection plug 260. In addition, the tubular body 268 of the hydraulic port protection plug 260 shown in FIG. 8B has an annular groove 292 that retains another O-ring seal 294 that is arranged to contact and seal against the inner surface 286 of the hydraulic port 274. Other than those differences, the hydraulic port protection plugs 160, 260 shown in FIGS. 8A and 8B are structurally similar and function in similar ways.

Figure 9A:
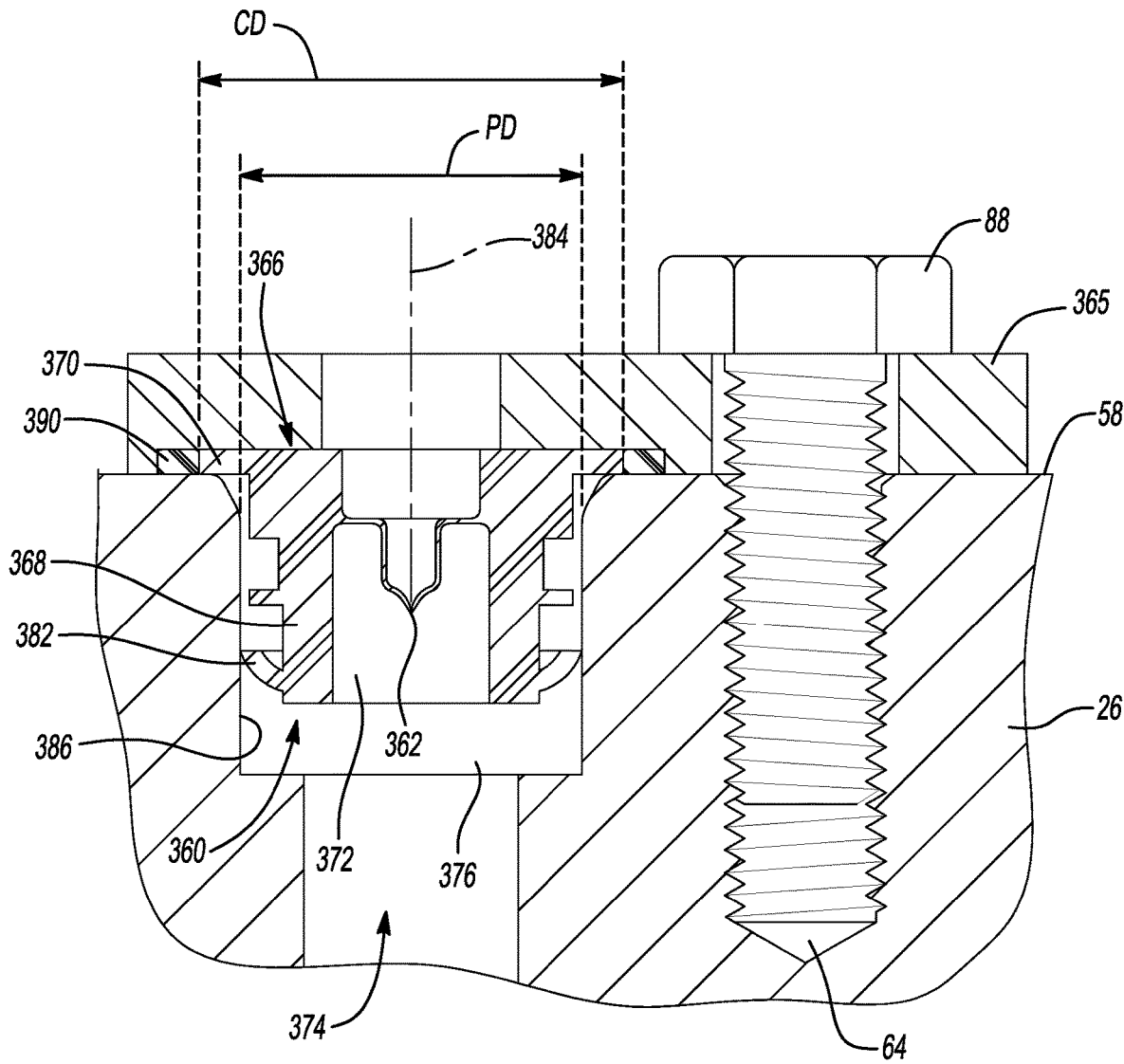
FIG. 9A is an enlarged cross-sectional view of the lower housing of the exemplary shock absorber assembly shown in FIG. 1 and illustrates another exemplary hydraulic port protection plug that is installed in an exemplary hydraulic port in the lower housing.
Figure 9B:
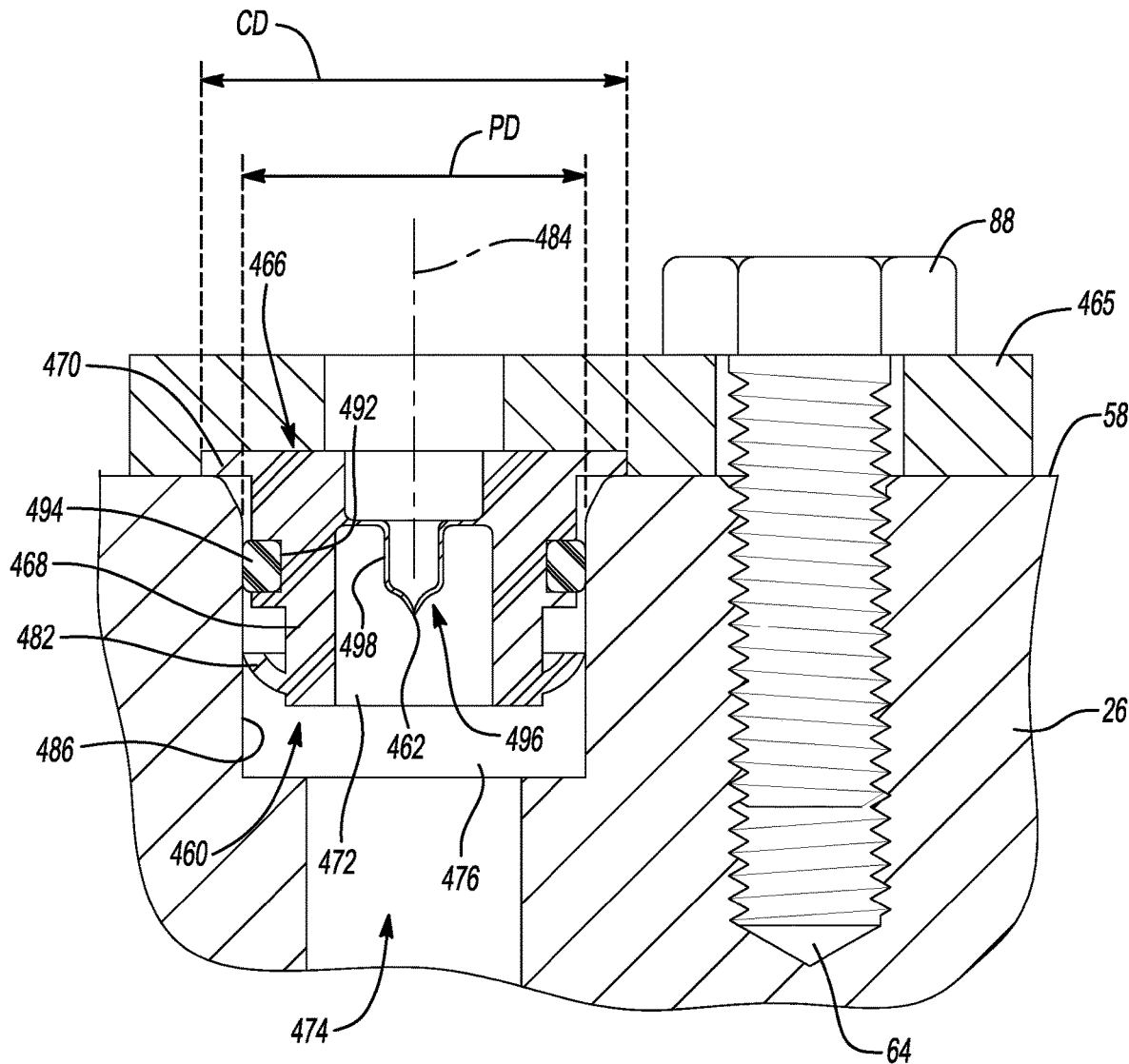
FIG. 9B is an e enlarged cross-sectional view of the lower housing of the exemplary shock absorber assembly shown in FIG. 1 and illustrates another exemplary hydraulic port protection plug that is installed in an exemplary hydraulic port in the lower housing.

FIGS. 9A and 9B illustrate two alternative configurations for the hydraulic port protection plugs 360, 460, where each hydraulic port protection plug 360, 460 has a self-closing pressure relief opening 362, 462 that is included in a one-way joker valve 396, 496. The hydraulic port protection plugs 360, 460 also have a cap portion 366, 466 and a tubular body 368, 468. The tubular body 368, 468 extends from the cap portion 366, 466 and has a geometric configuration that is configured to be insertable into a primary opening 376, 476 in a hydraulic port 374, 474 provided in the lower housing 26 of the shock absorber assembly 20. The primary opening 376, 476 in the hydraulic port 374, 474 has a primary opening diameter PD. The cap portion 366, 466 of the hydraulic port protection plugs 360, 460 includes an end wall 370, 470 and the tubular body 368, 468 extends from the end wall 370, 470 to define an open-ended cavity 372, 472 within the tubular body 368, 468 that is bounded at one end by the end wall 370, 470. The end wall 370, 470 of the cap portion 366, 466 extends radially outward from the tubular body 368, 468 to define a cap diameter CD that is larger than the primary opening diameter PD.

The tubular body 368, 468 of the hydraulic port protection plugs 360, 460 shown in FIGS. 9A-9B also include a deflectable flange 382, 482 that extends outwardly from the tubular body 368, 468 at a location that is longitudinally spaced from the end wall 370, 470. Stated another way, the deflectable flange 382, 482 extends radially outward away from a centerline 384, 484 of the hydraulic port protection plugs 360, 460 and is configured to seal against an inner surface 386, 486 of the hydraulic ports 374, 474 in the lower housing 26 of the shock absorber assembly 20.

FIGS. 9A-9B illustrate a pressurizing tool assembly 365, 465 that is secured in an abutting arrangement with the hydraulic port land 58 on the lower housing 26 by a bolt 88 that screws into the threaded bore 64 in the hydraulic port land 58. The one-way joker valves 396, 496 include an elastic valve throat 398, 498 that extends from the end wall 370, 470 into the open-ended cavity 372, 472 and is therefore concentrically arranged within the tubular body 368, 468 of the hydraulic port protection plugs 360, 460. The elastic/resilient properties of the valve throat 398, 498 permits the self-closing pressure relief opening 162, 262 at the end/tip of the valve throat 398, 498 to open when pressurized air or gas is supplied to the pressurizing tool assembly 365, 465, which allows the shock absorber 24 to be charged after the hydraulic port protection plugs 360, 460 are installed in the hydraulic ports 174, 274 without removal.

FIGS. 9A and 9B differ in that they illustrate different sealing arrangements. In FIG. 9A, the pressurizing tool assembly 365 includes an O-ring seal 390 that extends annually about and is radially outward of the cap portion 366 of the hydraulic port protection plug 360. By contrast, in FIG. 9B, the tubular body 468 of the hydraulic port protection plug 460 has an annular groove 492 that retains an O-ring seal 494 that is arranged to contact and seal against the inner surface 486 of the hydraulic port 474. Other than those differences, the hydraulic port protection plugs 360, 460 shown in FIGS. 9A and 9B are structurally similar and function in similar ways.

Figure 10:
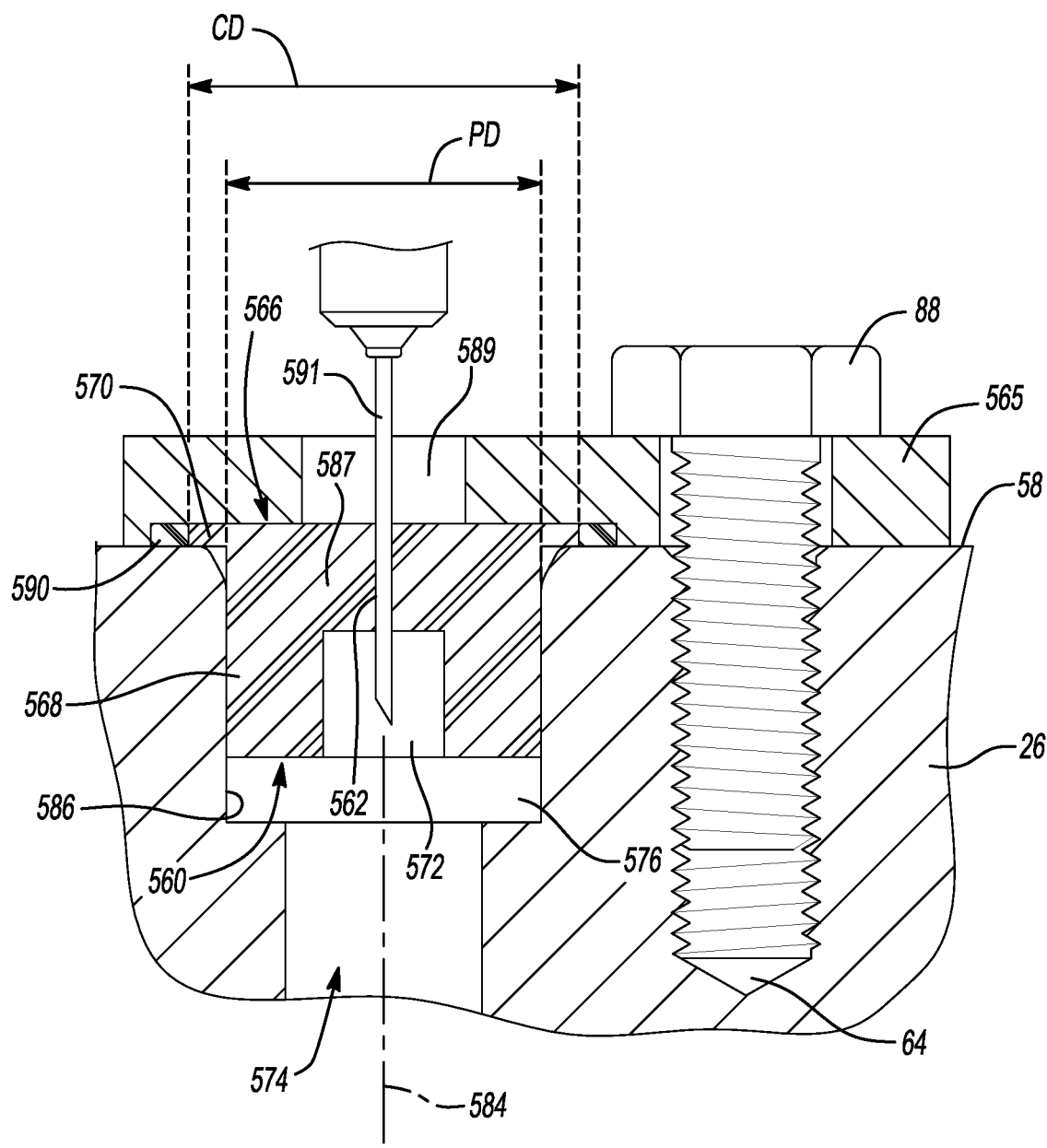
FIG. 10 is an enlarged cross-sectional view of the lower housing of the exemplary shock absorber assembly shown in FIG. 1 and illustrates another exemplary hydraulic port protection plug that is installed in an exemplary hydraulic port in the lower housing.

FIG. 10 illustrates another alternative configuration for a hydraulic port protection plug 560, where a self-closing pressure relief opening 562 is provided by a resealable needle piercing zone 587 in the hydraulic port protection plug 560. The hydraulic port protection plugs 560 has a cap portion 566 and a tubular body 568. The tubular body 568 extends from the cap portion 566 and has a geometric configuration that is configured to be insertable into a primary opening 576 in a hydraulic port 574 provided in the lower housing 26 of the shock absorber assembly 20. The primary opening 576 in the hydraulic port 574 has a primary opening diameter PD. The cap portion 566 of the hydraulic port protection plugs 560 includes an end wall 570 and the tubular body 568 extends from the end wall 570 to define an open-ended cavity 572 within the tubular body 568 that is bounded at one end by the end wall 570. The end wall 570 of the cap portion 566 extends radially outward from the tubular body 568 to define a cap diameter CD that is larger than the primary opening diameter PD.

FIG. 10 illustrates a pressurizing tool assembly 565 that is secured in an abutting arrangement with the hydraulic port land 58 on the lower housing 26 by a bolt 88 that screws into the threaded bore 64 in the hydraulic port land 58. The pressurizing tool assembly 565 includes an O-ring seal 590 that extends annually about and is radially outward of the cap portion 566 of the hydraulic port protection plug 560. At least a portion of the end wall 570 of the cap portion 566 is made of a resilient material in the resealable needle piercing zone 587, which is arranged at or near a centerline 584 of the hydraulic port protection plug 560. Optionally, a detent 589 may be provided in the end wall 570 of the cap portion 566 that is aligned with the centerline 584 and resealable needle piercing zone 587 to ensure proper alignment between needle 591 and the resealable needle piercing zone 587. When a needle 591 is inserted into the resealable needle piercing zone 587, pressurized air or gas that is supplied to the pressurizing tool assembly 165, 265 may pass through the self-closing pressure relief opening 562 formed by the needle 591. Similarly, the needle 591 may be inserted into the resealable needle piercing zone 587 to bleed pressure from the hydraulic port 574 to accommodate movement of the piston 42 and the piston rod 44. The needle 591 or a similar extraction tool may also be used as a suction device to suck out any hydraulic fluid or oil remaining in the hydraulic port 574 before the hydraulic port protection plug 560 is removed at the car manufacturing line. This aspect, which can be utilized across all embodiments described herein, provides the added benefit of a cleaner environment at the car manufacturing line.

Figure 11A:
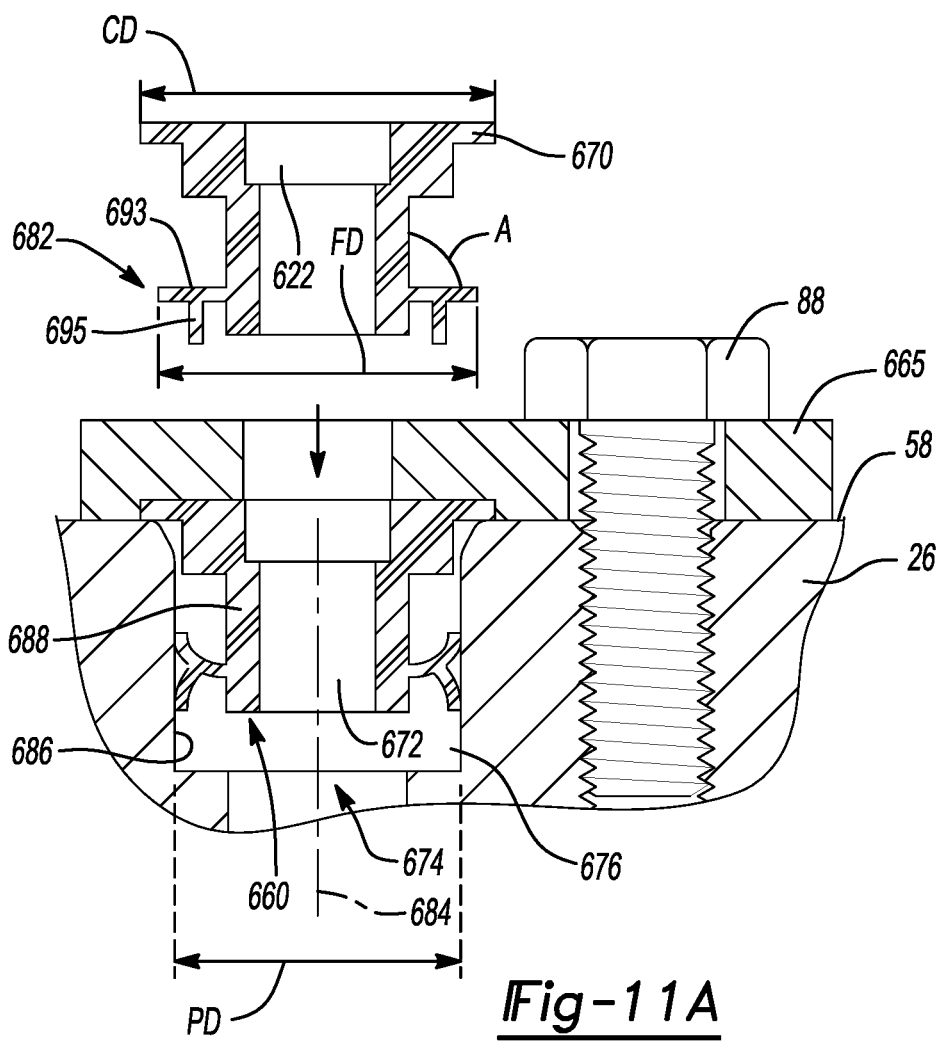
FIG. 11A is an enlarged cross-sectional view of the lower housing of the exemplary shock absorber assembly shown in FIG. 1 and illustrates another exemplary hydraulic port protection plug that is shown being installed in an exemplary hydraulic port in the lower housing.
Figure 11B:
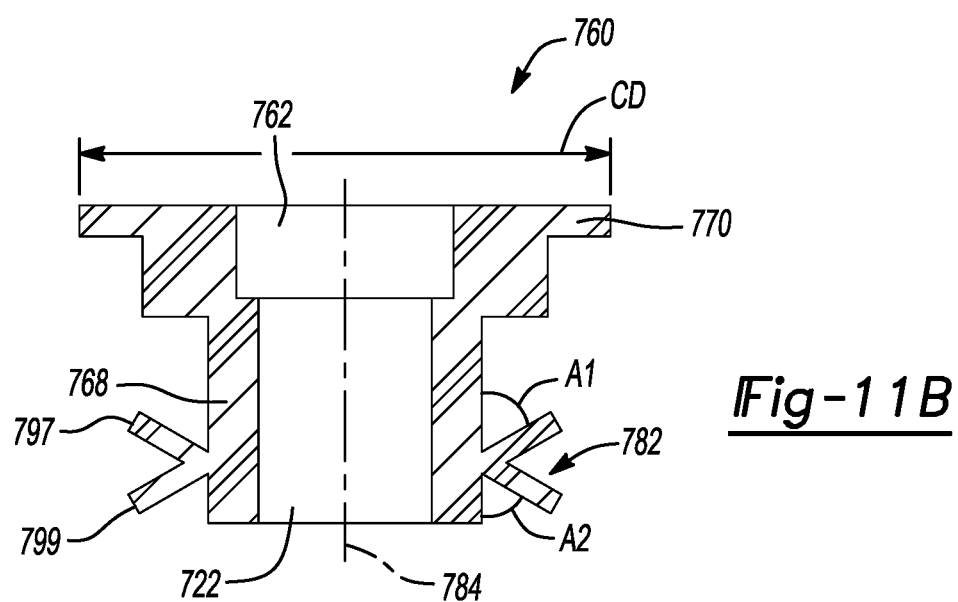
FIG. 11B is an enlarged cross-sectional view of another exemplary hydraulic port protection plug for installation in a hydraulic port provided in the lower housing of the exemplary shock absorber assembly shown in FIG. 1.

FIGS. 11A-11B, illustrate two additional configurations of hydraulic port protection plugs 660, 760, where each hydraulic port protection plug 660, 760 has a self-closing pressure relief opening 662, 762 in the form of a linear slit. The hydraulic port protection plugs 660, 760 also have a cap portion 666, 766 and a tubular body 668, 768. The tubular body 668, 768 extends from the cap portion 666, 766 and has a geometric configuration that is configured to be insertable into a primary opening 676 in a hydraulic port 674 provided in the lower housing 26 of the shock absorber assembly 20. The primary opening 676 in the hydraulic port 674 has a primary opening diameter PD. The cap portion 666, 766 of the hydraulic port protection plugs 660, 760 includes an end wall 670, 770 and the tubular body 668, 768 extends from the end wall 670, 770 to define an open-ended cavity 672, 772 within the tubular body 668, 768 that is bounded at one end by the end wall 670, 770. The end wall 670, 770 of the cap portion 668, 768 extends radially outward from the tubular body 668, 768 to define a cap diameter CD that is larger than the primary opening diameter PD.

FIG. 11A illustrates a pressurizing tool assembly 665 that is secured in an abutting arrangement with the hydraulic port land 58 on the lower housing 26 by a bolt 88 that screws into the threaded bore 64 in the hydraulic port land 58. At least a portion of the cap portion 666, 766 of the hydraulic port protection plugs 660, 760 is made of an elastic material that permits the self-closing pressure relief opening 662, 762 to open when pressurized air or gas is supplied to the pressurizing tool assembly 665 or if pressure increases in the hydraulic ports 674 as a result of movement of the piston 42 and the piston rod 44 after the hydraulic port protection plugs 674, 674 are inserted into the hydraulic port 674.

FIGS. 11A and 11B differ in that they illustrate different deflectable flanges 682, 782 that are designed to seal against an inner surface 686 of the hydraulic port 674 in the lower housing 26 of the shock absorber assembly 20. The hydraulic port protection plug 660 illustrated in FIG. 11A has a deflectable flange 682 that includes a disc-shaped flange portion 693 that extends radially outward away from a centerline 684 of the hydraulic port protection plug 660 to a flange diameter FD that is larger than the primary opening diameter PD of the hydraulic port 674. The deflectable flange 682 of the hydraulic port protection plug 660 also includes an annular wall 695 that extends axially from the disc-shaped flange portion 693. As a result, the annular wall 695 is concentrically arranged in a radially spaced relationship with a portion of the tubular body 668 such that the deflectable flange 682 has a T-shaped cross-section before the hydraulic port protection plug 660 is installed in the hydraulic port 674. In other words, the disc-shaped flange portion 693 is arranged at a perpendicular angle A relative to the tubular body 668 before the hydraulic port protection plug 660 is installed in the hydraulic port 674. Because the flange diameter FD is larger than the primary opening diameter PD of the hydraulic port 674, the deflectable flange 682 deflects when the tubular body 668 is inserted into the hydraulic port 674, which gives the deflectable flange 682 a Y-shaped cross-section after the hydraulic port protection plug 660 is installed in the hydraulic port 674.

The hydraulic port protection plug 760 illustrated in FIG. 11B has a deflectable flange 782 that includes a pair of disc-shaped flange portions 797, 799 that extend radially outward, away from a centerline 784 of the hydraulic port protection plug 760. The disc-shaped flange portions 797, 799 are arranged at first and second oblique angles A1, A2 relative to the tubular body 768 such that the deflectable flange 782 has a V-shaped cross-section before the hydraulic port protection plug 760 is installed in the hydraulic port 674.

A method of assembling the shock absorber assembly 20 described above is also provided. With reference to FIG. 12, the method comprises step 802 of installing a piston 42 and a piston rod 44 inside a shock absorber housing 26 and step 804 of inserting one or more hydraulic port protection plugs 60 into one or more hydraulic ports 74 in the shock absorber housing 26. After step 804, the method with steps 806 of charging one or more hydraulic ports 74 with pressurized air or gas to bias the piston 42 and the piston rod 44 to an intermediate travel position (i.e., approximately half way between a fully compressed travel position and a fully extended travel position) by passing the pressurized air or gas through a self-closing pressure relief opening 62 in the hydraulic port protection plugs 60 after the hydraulic port protection plugs 60 are inserted into the hydraulic ports 74. By way of example and without limitation, this step may include attaching a pressurizing tool assembly 165 to a hydraulic port land 58 and supplying pressurized air at a pressure of approximately 3 bar. As explained above, it was not previously possible to perform step 806 after installing traditional shipping plugs because they would completely block off the hydraulic ports 74. After step 806, the method can proceed with step 808 of continuing and completing assembly of the shock absorber assembly 20 with the piston 42 and the piston rod 44 in the intermediate travel position. It should be appreciated that steps 802-806 may be carried out in a clean room to reduce the chance of contamination and that step 808 of continuing and completing assembly of the shock absorber assembly 20 may be performed outside a clean room because the hydraulic port protection plugs 60 operate to prevent contaminants from entering the hydraulic ports 74 of the shock absorber assembly 20. It should also be appreciated that the reason for pressurization step 806 is to prevent the piston rod 44 from moving inwards into the shock absorber housing 26 during the mounting of several modular components over the piston rod 44 such as the air bladder 40. The positive pressure of approximately 3 bar inside the first and second working chambers 50, 52 of the shock absorber 24 helps prevent the piston rod 44 from moving during assembly.

The method may further comprise steps 810 of depressurizing the hydraulic ports 74 with the hydraulic port protection plugs 60 installed in the hydraulic ports 74 and step 812 of moving the piston 42 and the piston rod 44 to the fully compressed travel position with the hydraulic port protection plugs 60 installed in the hydraulic ports 74 to place the shock absorber assembly 20 in a shipping configuration. Again, steps 810 and 812 were not previously possible with traditional shipping plugs, which could not permit air to escape from the hydraulic ports 74 for depressurization and were prone to blow out of the hydraulic ports 74 if installed when the piston rod 44 was moved to the fully compressed travel position. Previously, the shipping plugs would need to be removed during any pressurization or depressurization operations and also if the piston rod 44 needs to be moved. The requirement to remove the shipping plugs during these procedures presented points in the assembly process where contaminants could enter the hydraulic ports 74.

The method may also include step 814 of removing the hydraulic port protection plugs 60 from the hydraulic ports 74 in the shock absorber housing 26, step 816 of installing a hydraulic fitting in each of the hydraulic ports 74, and step 818 of charging the hydraulic ports 74 with hydraulic fluid or oil. Thus, it should be appreciated that the shock absorber assembly 20 described herein may be shipped to a customer "dry" and may not be filled with hydraulic fluid or oil until after the shock absorber assembly 20 is installed in a vehicle. Step 814 may further include extracting residual hydraulic fluid or oil from the hydraulic port(s) 74 by inserting an extraction tool through the self-closing pressure relief opening 62 in the hydraulic port protection plug(s) 60 prior to their removal from the hydraulic port(s) 74 so that any hydraulic fluid or oil that has collected in the hydraulic port(s) 74 behind the hydraulic port protection plug(s) 60 during shipping or storage does not run out when the hydraulic port protection plug(s) 60 are removed. It should further be appreciated that it is easier to remove the hydraulic port protection plugs 60 from the hydraulic ports 74 in step 814 because the self-closing pressure relief opening 62 in the hydraulic port protection plugs 60 prevent a vacuum from forming in the hydraulic ports 74 that can make removable of the hydraulic port protection plugs 60 more difficult.

Furthermore, step 804 of inserting the hydraulic port protection plugs 60 into the hydraulic ports 74 in the shock absorber housing 26 is performed independently of any particular positioning of the piston 42 and the piston rod 44 in the shock absorber housing 26. This is also different from what was previously possible with traditional shipping plugs. Previously, the piston rod 44 had to be fully compressed when the shipping plug was inserted into the compression side hydraulic port 74 (i.e., the hydraulic port 74 arranged in fluid communication with the second working chamber 52) and then the piston rod 44 had to be fully extended when the shipping plug was inserted into the rebound side hydraulic port 74 (i.e., the hydraulic port 74 arranged in fluid communication with the second working chamber 50) in order to prevent the shipping plugs from blowing out of the hydraulic ports. Once this was done, the piston rod 44 would naturally return to an intermediate travel position and the shock absorber assembly 20 would then be shipped in this condition.

Many other modifications and variations of the present disclosure are possible in light of the above teachings and may be practiced otherwise than as specifically described while within the scope of the appended claims.

What is claimed is:

1. A pre-installation shock absorber assembly, comprising:
    a shock absorber with a sliding piston that divides the shock absorber into first and second working chambers, a piston rod mounted to the sliding piston, and a lower housing opposite the piston rod;
    at least one hydraulic port provided in the lower housing of the shock absorber;
    a hydraulic port protection plug having a cap portion and a tubular body that extends from the cap portion and has a geometric configuration that is configured to be insertable into the at least one hydraulic port in the lower housing; and
    a self-closing pressure relief opening that extends through the cap portion of the hydraulic port protection plug and is configured to open and close in response to pressure changes.

2. The pre-installation shock absorber assembly of claim 1, wherein the cap portion of the hydraulic port protection plug includes an end wall and wherein the tubular body of the hydraulic port protection plug extends from the end wall to define an open-ended cavity within the tubular body that is bounded at one end by the end wall.

3. The pre-installation shock absorber assembly of claim 2, wherein the self-closing pressure relief opening is a linear slit that extends through the end wall of the cap portion and is arranged in fluid communication with the open-ended cavity defined by the tubular body of the hydraulic port protection plug.

4. The pre-installation shock absorber assembly of claim 2, wherein the self-closing pressure relief opening is included in a one-way joker valve that includes an elastic valve throat that extends into the open-ended cavity defined by the tubular body of the hydraulic port protection plug.

5. The pre-installation shock absorber assembly of claim 2, wherein at least a portion of the end wall of the cap portion is made of a resilient material to define a resealable needle piercing zone at or near a centerline of the hydraulic port protection plug.

6. The pre-installation shock absorber assembly of claim 2, wherein the at least one hydraulic port has a primary opening diameter and the end wall of the cap portion of the hydraulic port protection plug extends radially outward from the tubular body to define an outer diameter of the cap portion that is larger than the primary opening diameter.

7. The pre-installation shock absorber assembly of claim 2, wherein the tubular body of the hydraulic port protection plug includes a deflectable flange that is configured to seal against an inner surface of the at least one hydraulic port in the lower housing of the shock absorber.

8. The pre-installation shock absorber assembly of claim 1, wherein at least a portion of the cap portion of the hydraulic port protection plug is made of an elastic material that permits the self-closing pressure relief opening to open and close and bleed pressure from the at least one hydraulic port in response to a pressure increase in the least one hydraulic port caused by movement of the piston and piston rod after the hydraulic port protection plug is inserted into the at least one hydraulic port.

9. The pre-installation shock absorber assembly of claim 1, wherein the hydraulic port protection plug is installed in the at least one hydraulic port in the lower housing shock absorber and the shock absorber is in a pre-installation condition and does not contain a working volume of oil.

10. A hydraulic port protection plug for insertion into a hydraulic port in a shock absorber assembly, the hydraulic port protection plug comprising:
   a cap portion having a disc-shaped end wall;
   a tubular body extending from the cap portion to define an open-ended cavity within the tubular body that is bounded at one end by the disc-shaped end wall of the cap portion; and
   a self-closing pressure relief opening that extends through the disc-shaped end wall in the cap portion and is arranged in fluid communication with the open-ended cavity defined by the tubular body,
   wherein at least a portion of the disc-shaped end wall is made of an elastic material that permits the self-closing pressure relief opening to open and close in response to pressure changes.

11. The hydraulic port protection plug of claim 10, further comprising:
   a deflectable flange that extends outwardly from the tubular body at a location that is longitudinally spaced from the disc-shaped end wall.

12. The hydraulic port protection plug of claim 11, wherein the deflectable flange includes a disc-shaped flange portion that extends radially outward away from a centerline of the hydraulic port protection plug.

13. The hydraulic port protection plug of claim 12, wherein the deflectable flange includes an annular wall that extends axially from the disc-shaped flange portion and is concentrically arranged in a radially spaced relationship with a portion of the tubular body such that the deflectable flange has a T-shaped cross-section prior to insertion in the hydraulic port.

14. The hydraulic port protection plug of claim 11, wherein the deflectable flange includes a pair of disc-shaped flange portions that extend radially outward away from a centerline of the hydraulic port protection plug and are arranged at oblique angles relative to the tubular body such that the deflectable flange has a V-shaped cross-section prior to insertion in the hydraulic port.

15. The hydraulic port protection plug of claim 11, wherein the tubular body has an annular groove that retains an O-ring seal.

16. The hydraulic port protection plug of claim 10, wherein the tubular body has a body diameter and the disc-shaped end wall of the cap portion extends radially outwardly from the tubular body to define a cap diameter that is larger than the body diameter.

17. A method of assembling a shock absorber assembly, the method comprising the steps of:
   installing a piston and a piston rod inside a shock absorber housing;
   inserting at least one hydraulic port protection plug into at least one hydraulic port in the shock absorber housing;
   charging the at least one hydraulic port with pressurized air or gas to bias the piston and the piston rod to an intermediate travel position by passing the pressurized air or gas through a self-closing pressure relief opening in the at least one hydraulic port protection plug after the at least one hydraulic port protection plug is inserted into the at least one hydraulic port; and
   continuing assembly of the shock absorber assembly with the piston and the piston rod in the intermediate travel position.

18. The method according to claim 17, further comprising the steps of:
   depressurizing the at least one hydraulic port with the at least one hydraulic port protection plug installed in the at least one hydraulic port; and
   moving the piston and the piston rod to a fully compressed travel position with the at least one hydraulic port protection plug installed in the at least one hydraulic port to place the shock absorber assembly in a shipping configuration.

19. The method according to claim 18, further comprising the steps of:
   extracting residual hydraulic fluid or oil from the at least one hydraulic port by inserting an extraction tool through the self-closing pressure relief opening in the at least one hydraulic port protection plug prior to removing the at least one hydraulic port protection plug from the at least one hydraulic port;
   removing the at least one hydraulic port protection plug from the at least one hydraulic port;
   installing a hydraulic fitting in the at least one hydraulic port; and
   charging the at least one hydraulic port with hydraulic fluid or oil.

20. The method according to claim 17, wherein the step of inserting at least one hydraulic port protection plug into at least one hydraulic port in the shock absorber housing is performed independently of any particular positioning of the piston and the piston rod in the shock absorber housing.

* * * * *